United States Patent
Grosser et al.

(10) Patent No.: US 8,660,118 B2
(45) Date of Patent: Feb. 25, 2014

(54) METHODS, SYSTEMS, AND COMPUTER READABLE MEDIA FOR NEXT HOP SCALING

(75) Inventors: Donald B. Grosser, Apex, NC (US); Edward J. Rovner, Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 499 days.

(21) Appl. No.: 12/950,587

(22) Filed: Nov. 19, 2010

(65) Prior Publication Data

US 2012/0127996 A1 May 24, 2012

(51) Int. Cl.
*H04L 12/28* (2006.01)

(52) U.S. Cl.
USPC .......................................... 370/389; 370/392

(58) Field of Classification Search
USPC ................................................ 370/392, 389
See application file for complete search history.

(56) References Cited

U.S. PATENT DOCUMENTS

| | | | |
|---|---|---|---|
| 6,192,051 B1 * | 2/2001 | Lipman et al. ................ | 370/389 |
| 2007/0268915 A1 | 11/2007 | Zelig et al. | |
| 2008/0240133 A1 | 10/2008 | Tanaka | |
| 2010/0128729 A1 | 5/2010 | Yazaki et al. | |
| 2010/0272107 A1 * | 10/2010 | Papp et al. .................... | 370/392 |
| 2011/0069706 A1 * | 3/2011 | Sen et al. ...................... | 370/392 |
| 2012/0127999 A1 | 5/2012 | Grosser, Jr. et al. | |

FOREIGN PATENT DOCUMENTS

WO WO 2012/068579 A2 5/2012

OTHER PUBLICATIONS

Notification of Transmittal of the International Search Report and the Written Opinion of the International Searching Authority, or the Declaration for International Patent Application No. PCT/US2011/061690 (Jul. 31, 2012).
Notification Concerning Availability of the Publication of the International Application for International Patent Application No. PCT/US2011/061690 (May 24, 2012).
Commonly-assigned, co-pending U.S. Appl. No. 12/972,391 for "Methods, Systems, and Ccomputer Readable Media for Next Hop Scaling with Link Aggregation," (Unpublished, filed Dec. 17, 2010).
"BCM56510 Product Brief," Broadcom®, pp. 1-2 (Jun. 13, 2006).
"Statement of Donald B. Grosser, Jr. and Edward J. Rovner Regarding Extreme Networks Prior Extreme Networks Packet Forwarding Lookup Architecture," pp. 1-3 (Jul. 25, 2013).
Non-Final Office Action for U.S. Appl. No. 12/972,391 (Dec. 3, 2012).
Communication of European publication number and Information on the application of Article 67(3) EPC for Eurpoean Patent Application No. 11841306.1 (Aug. 28, 2013).
Notice of Allowance and Fee(s) Due for U.S. Appl. No. 12/972,391 (Aug. 1, 2013).

* cited by examiner

*Primary Examiner* — Sai-Ming Chan
(74) *Attorney, Agent, or Firm* — Jenkins, Wilson, Taylor & Hunt, P.A.

(57) ABSTRACT

The subject matter described herein includes a packet forwarding device that implements next hop scaling. Rather than storing a complete set of next hop bindings at each packet processor, the storage of next hop bindings is distributed among packet processors in the packet forwarding device such that each packet processor stores next hop bindings for the hosts that are directly connected to the packet processor. For hosts that are not directly connected to a packet processor, the packet processor stores relay entries. Because of the distributed storage of next hop bindings, the number of hosts that can be served by a single packet forwarding device is increased over packet forwarding devices where each packet processor stores a complete set of next hop bindings for all connected hosts.

23 Claims, 4 Drawing Sheets

METHODS, SYSTEMS, AND COMPUTER READABLE MEDIA FOR NEXT HOP SCALING

TECHNICAL FIELD

The subject matter described herein relates to packet forwarding devices. More particularly, the subject matter described herein relates to packet forwarding devices with improved next hop scaling.

BACKGROUND

Address resolution protocol (ARP) is the protocol by which bindings between IP addresses and MAC addresses are communicated between devices. When a device needs to send an IP packet to another device, the sending device must first determine the MAC address corresponding to IP address of the next hop (next machine in the path to the destination or the destination itself, if the next machine is the destination). The sending device can use ARP to determine the next hop MAC address. The sending machine broadcasts an ARP request with the next hop IP address to all machines within a particular domain, and the machine whose IP address is contained in the ARP request responds with the machine's MAC address. Once the sending machine obtains the next hop MAC address, the sending machine stores the binding between the IP address and the MAC address in memory so that the binding can be used for forwarding subsequent packets to the same machine.

In some packet forwarding architectures, the lookup used to determine the next hop information for a received packet is performed solely by the ingress packet processor, i.e., the packet processor associated with the port of a packet forwarding device on which the packet is received. The ingress packet processor performs a layer 3 route lookup based on the IP address in the received packet to identify not only the destination port in the packet forwarding device for the packet, but also the destination MAC address for the packet. Using such an ingress lookup architecture designed for full-mesh traffic, because a packet destined for a particular host may arrive on any port of the packet forwarding device, the memory associated with each packet processor must store a complete set of ARP bindings for all of the hosts connected to the packet forwarding device.

Because the memory accessible by each packet processor is typically limited, the number of hosts that can be connected to a packet forwarding device can be limited by the memory available to a single packet processor, which greatly limits the scalability of the packet forwarding device. For example, in a packet forwarding architecture where each packet processor has a fixed amount of memory for storing ARP bindings the maximum number of ARP table entries is limited by the amount of memory of a single packet processor, because each packet processor must store the same complete set of ARP bindings. Stated differently, the requirement that each packet processor store the same complete set of ARP bindings reduces the scalability of the system by a factor of 1/(# of packet processors). Adding packet processors does not increase the number of hosts that the packet forwarding device can serve once the maximum number of ARP table entries, which is limited by the ARP binding storage space available to a single packet processor, is reached. Such a limitation is undesirable, especially when there is a need for the packet forwarding device to serve large numbers of connected hosts.

One particular network configuration for which it is desirable to have a packet forwarding device serve large numbers of connected hosts occurs when virtualization is used. In a virtualization environment, a single physical host may be configured with many virtual hosts. Each virtual host has its own separate operating system, network address, and MAC address. Each virtual host would require an ARP binding in a packet forwarding device. Thus, connecting many physical hosts to the packet forwarding device, where each of the physical hosts includes plural virtual hosts further increases the need for scalable packet forwarding device architectures.

Accordingly, in light of these difficulties, there exists a need for methods, systems, and computer readable media for next hop scaling.

SUMMARY

The subject matter described herein includes methods, systems, and computer readable media for next hop scaling. According to one aspect of the subject matter described herein, a system for next hop scaling is provided. The system includes a plurality of I/O modules, each having at least one I/O port for communicating packets to and receiving packets from hosts external to the packet forwarding device. The packet forwarding device further includes a plurality of packet processors associated with the I/O modules for performing packet forwarding operations. The packet forwarding device further includes a memory associated with each packet processor for storing next hop bindings. An ingress packet processor and memory are configured to relay to an egress packet processor separate from the ingress packet processor a packet whose next hop is connected to the egress packet processor. The egress packet processor and its memory that receive the packet are configured to perform a next hop lookup to supply a destination MAC address and forward the packet from the packet forwarding device.

The term "lookup" is intended to refer to any type of operation for selecting particular data from a set of data. For example, a lookup could include a hash operation where a hash value is computed based on a selection parameter or parameters, and the hash value is used to select data of interest from a data set.

The subject matter described herein for next hop scaling can be implemented using a non-transitory computer readable medium having stored thereon executable instructions that when executed by the processor of a computer control the computer to perform steps. Exemplary computer readable media for implementing the subject matter described herein may include chip memory devices, disk memory devices, programmable logical devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be described with reference to the accompanying drawings of which.

DETAILED DESCRIPTION

Figure 1:
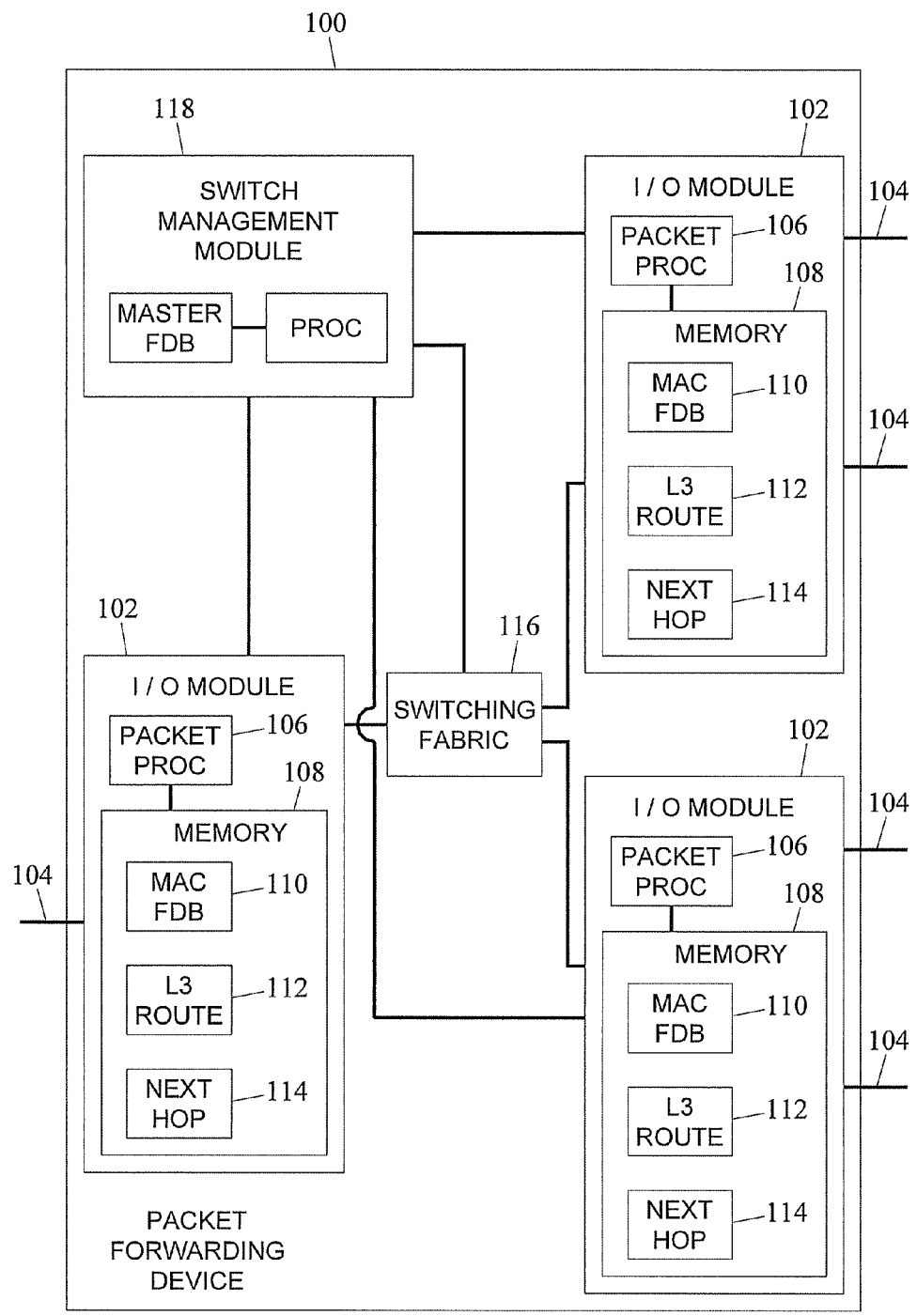
FIG. 1 is a block diagram of a packet forwarding device according to an embodiment of the subject matter described herein.

The subject matter described herein includes methods, systems, and computer readable media for next hop scaling. FIG. 1 is a block diagram illustrating an exemplary packet forwarding device for implementing distributed next hop scaling according to an embodiment of the subject matter described herein. Referring to FIG. 1, packet forwarding device 100 may have layer 2 switching and layer 3 packet forwarding capabilities, where layers 2 and 3 refer to the corresponding layers in the OSI protocol stack. Packet forwarding device 100 includes a plurality of input/output (I/O) modules 102, each having at least one port 104 for communicating packets to and receiving packets from connected hosts, such as servers, personal computers, routers, etc. Each I/O module 102 includes a packet processor 106 and memory 108. Each packet processor 106 performs packet forwarding operations using packet forwarding information stored in its respective memory 108. In the illustrated example, each memory 108 includes a MAC forwarding database 110 for storing layer 2 packet forwarding information, a layer 3 longest prefix match or host route table 112 for storing layer 3 packet forwarding information, and a next hop table 114 for storing egress port, MAC address, and VLAN information. The combination of layer 3 route table 112 and next hop table 114 stores ARP bindings. For example, a lookup is performed in layer 3 route table 112 to determine a next hop identifier or index corresponding to the destination IP address in a received packet. The next hop identifier or index is used to perform a lookup in next hop table 114, which stores the MAC address corresponding to the destination IP address.

In addition to I/O modules 102, packet forwarding device 100 includes a switch fabric 116 that is responsible for forwarding packets between I/O modules 102 and between I/O modules 102 and switch management module 118. Switch management module 118 controls the overall operation of packet forwarding device 100. In addition, switch management module 118 may participate in IP routing protocols to populate layer 3 route tables 110 and may perform slowpath forwarding lookups for packets for which entries are not populated in layer 3 route tables 112.

Figure 2:
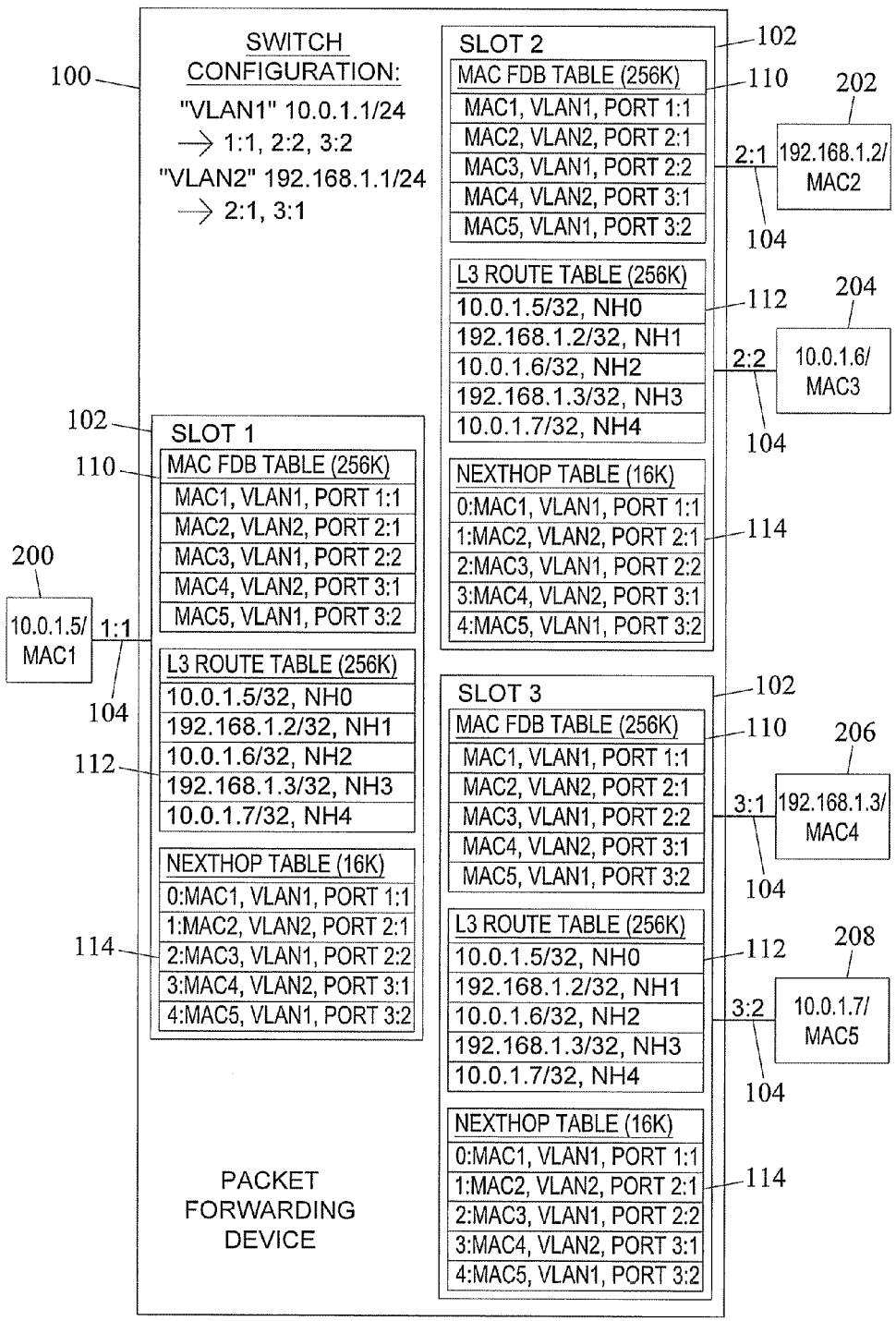
FIG. 2 is a block diagram illustrating tables in a packet forwarding device without next hop scaling.

FIG. 2 is a more detailed diagram of packet forwarding device 100 showing exemplary configurations of MAC forwarding databases 110, layer 3 route table 112, and next hop table 114. The remaining components illustrated in FIG. 1 are omitted for simplicity. In FIG. 2, I/O modules 102 are associated with different card slots in packet forwarding device 100. In the illustrated configuration, a single I/O module is associated with slot1, a single I/O module is associated with slot2, and a single I/O module is associated with slot3. It is also assumed for purposes of this example, that each I/O module includes a single packet processor. However, using plural packet processors per I/O module and/or slot is intended to be within the scope of the subject matter described herein.

In the illustrated example, each port 104 has an associated port number and a slot number. For example, 1:1 indicates slot1, port1, 2:1 indicates slot2, port1, etc. The switch configuration of packet forwarding device 100 includes two VLANs, VLAN1 and VLAN2, where VLAN1 includes IP address 10.0.1.1 and slot/port combinations 1:1, 2:2, and 3:2. VLAN2 includes IP address 198.168.1.1 and slot/port combinations 2:1 and 3:1.

Slot1:port1 is connected to a host 200 with IP address 10.0.1.5 and MAC address MAC1. Similarly, the remaining ports of packet forwarding device 100 are connected to hosts 202, 204, 206, and 208 with the IP address/MAC address combinations shown in FIG. 2. Hosts 200, 202, 204, 206, and 208 can be physical devices or a combination of physical and virtual devices. For example, hosts 200, 202, 204, 206, and 208 may be servers, client computers, routers, etc., with or without virtualization software.

It should be noted that next hop tables 114 associated with each I/O module 102 and packet processor are identical, with each next hop table 114 containing entries for all of the hosts connected to packet forwarding device 100, irrespective of the physical ports to which the hosts are connected. Accordingly, each time a new host is connected to any of the ports, the next hop table associated with each packet processor must be populated with the full MAC address, VLAN, and egress port for the newly connected host. As the number of hosts increases, the available storage space for the next hop table on each packet processor decreases by an amount required to store this information. Adding packet processors does not allow more hosts to be connected to packet forwarding device 100 once the available storage space for the next hop table is fully utilized on one of the packet processors. As a result, the scalability of packet forwarding device 100 when configured as illustrated in FIG. 2 is limited.

To avoid this limitation, the ARP bindings can be distributed across packet processors so that ARP bindings for hosts are stored only in the next hop tables of the packet processors to which the hosts are connected. Entries in a packet processor's next hop table for other hosts that are not connected to the packet processor can be indicated as relay entries in the next hop table used by the packet processor. If a packet received from an external port by a packet processor (hereinafter, the ingress packet processor) results in a match to a relay entry in the next hop table, the packet will be forwarded unmodified to the packet processor associated with the egress port (hereinafter, the egress packet processor). The egress packet processor will perform a lookup in its L3 route table and next hop table, determine the MAC address for the packet, replace the MAC address in the packet, and forward the packet from packet forwarding device 100.

Figure 3:
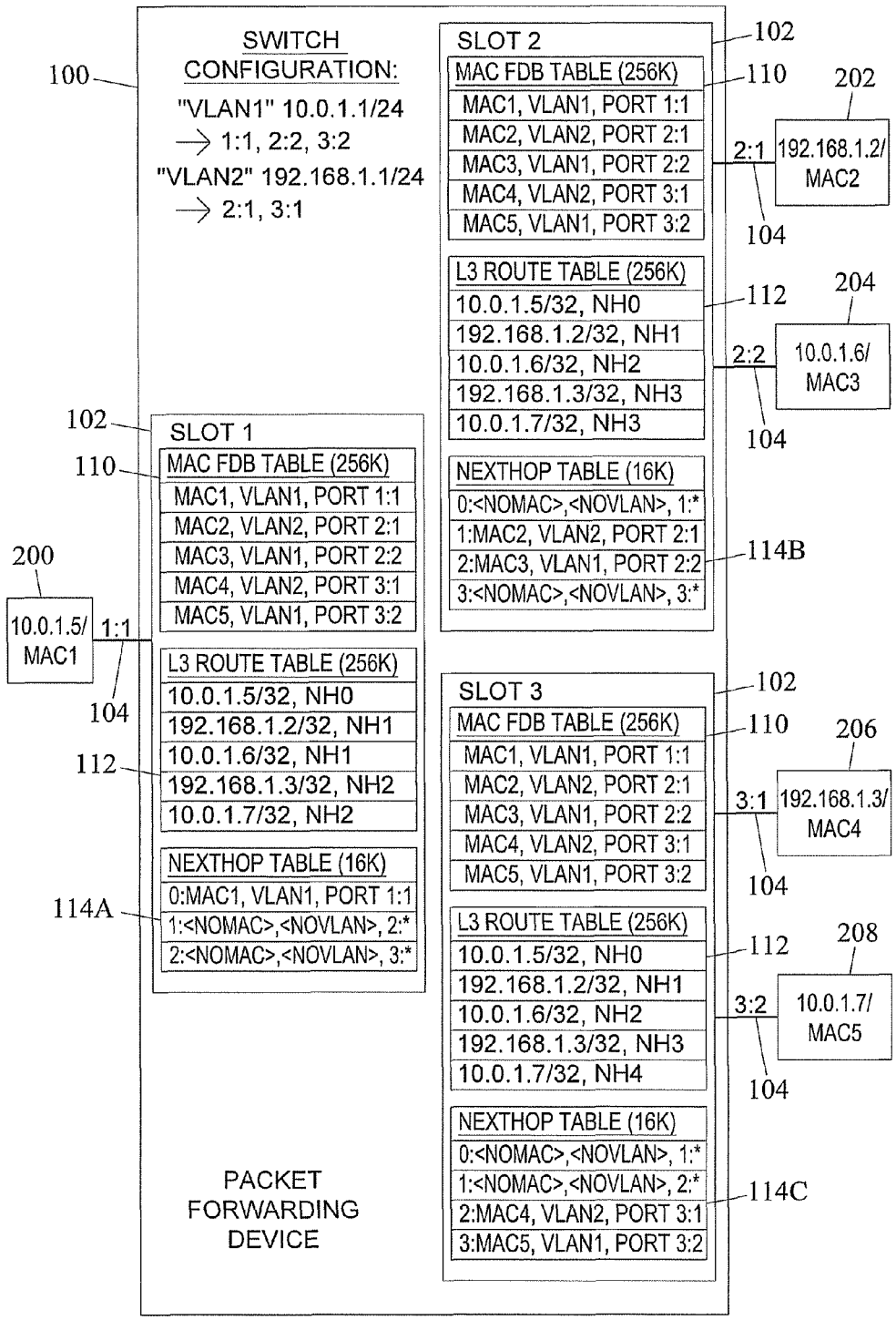
FIG. 3 is a block diagram of a packet forwarding device with next hop scaling according to an embodiment of the subject matter described herein.

FIG. 3 illustrates packet forwarding device 100 configured to perform ingress and egress packet forwarding lookups and with distributed ARP binding storage according to an embodiment of the subject matter described herein. In FIG. 3, next hop tables 114A, 114B, and 114C contain different next hop information. For example, next hop table 114A stores a MAC address for host 200 that is connected to the packet processor associated with next hop table 114A but does not contain MAC addresses for hosts connected to other packet processors. Rather, next hop table 114A contains relay entries for hosts connected to other packet processors, with the destination port indicated by an asterisk. The asterisks may indicate an unused port on the egress I/O module. The unused port may be any port that is not used for packet forwarding. When the egress packet processor receives a packet that has been relayed by an ingress packet processor, the packet will include a fabric header that indicates the destination port. The fabric header is inserted on the packet by the ingress packet processor so that the switch fabric will be able to direct the packet to the correct egress packet processor. If the fabric header egress port parameter indicates an unused port, such a parameter will trigger the egress packet processor to perform a lookup in its L3 route table and next hop table to determine the MAC address for the packet and the egress port for the packet. The egress packet processor will then replace the MAC address in the packet and forward the packet from packet forwarding device 100.

It should be noted that the next hop table associated with each packet processor is required to store only a single relay entry for each additional packet processor in the system, regardless of number of hosts connected to the other packet processors, which greatly reduces the amount of data that must be stored by each packet processor for hosts connected to other packet processors. It should also be noted that L3 route tables 112 associated with each packet processor differ from each other to account for the differences in the corresponding next hop tables.

In one example, if a packet is received by packet forwarding device 100 on port1:1, and the packet has IP address 192.168.1.2, the result is a match with the second entry in layer 3 route table 112 associated with slot1. The second entry in layer 3 route table 112 associated with slot1 yields next hop index, NH1. NH1 corresponds to the first entry in next hop table 114A, which indicates slot2, port "*". The packet is then forwarded to the packet processor associated with slot2. Because the packet is addressed to the unused port, the packet processor associated with slot2 will perform a lookup in its layer 3 route table and the result will be a match with the second entry in the L3 route table 112 associated with slot2, yielding next hop index NH1. Next hop index NH1 results in a match to the second entry in next hop table 114B. Accordingly, it is determined that the packet should be addressed to MAC address MAC2 and VLAN2. It is also determined that the packet should be forwarded on slot2, port1. The destination MAC address in the packet is replaced by MAC address MAC2 and the VLAN in the packet is set to VLAN2. The packet is then forwarded from packet forwarding device 100 on slot2, port1.

Because the packet forwarding device illustrated in FIG. 3 includes distributed storage of ARP bindings, rather than being limited to the storage available by a single packet processor for storing ARP bindings, the number of hosts to which packet forwarding device 100 can be connected is limited by the total of the memory available for ARP bindings across all of the packet processors. In the illustrated example, each next hop table has 16 kilobytes of available storage, meaning that the maximum next hop table size is 48 kilobytes, minus some overhead for the next hop table. This is in direct contrast to a configuration such as that illustrated in FIG. 2 where the maximum next hop table size is 16 kilobytes. Thus, the configuration illustrated in FIG. 3 has a nearly 3× increase in scalability over the configuration illustrated in FIG. 2. In addition, because each packet processor is responsible for full ARP bindings for directly connected hosts, the number of hosts that can be served by packet forwarding device 100 is scalable with the number of packet processors. As a result, the connectivity of packet forwarding device 100 can be increased by adding additional packet processors.

Figure 4:
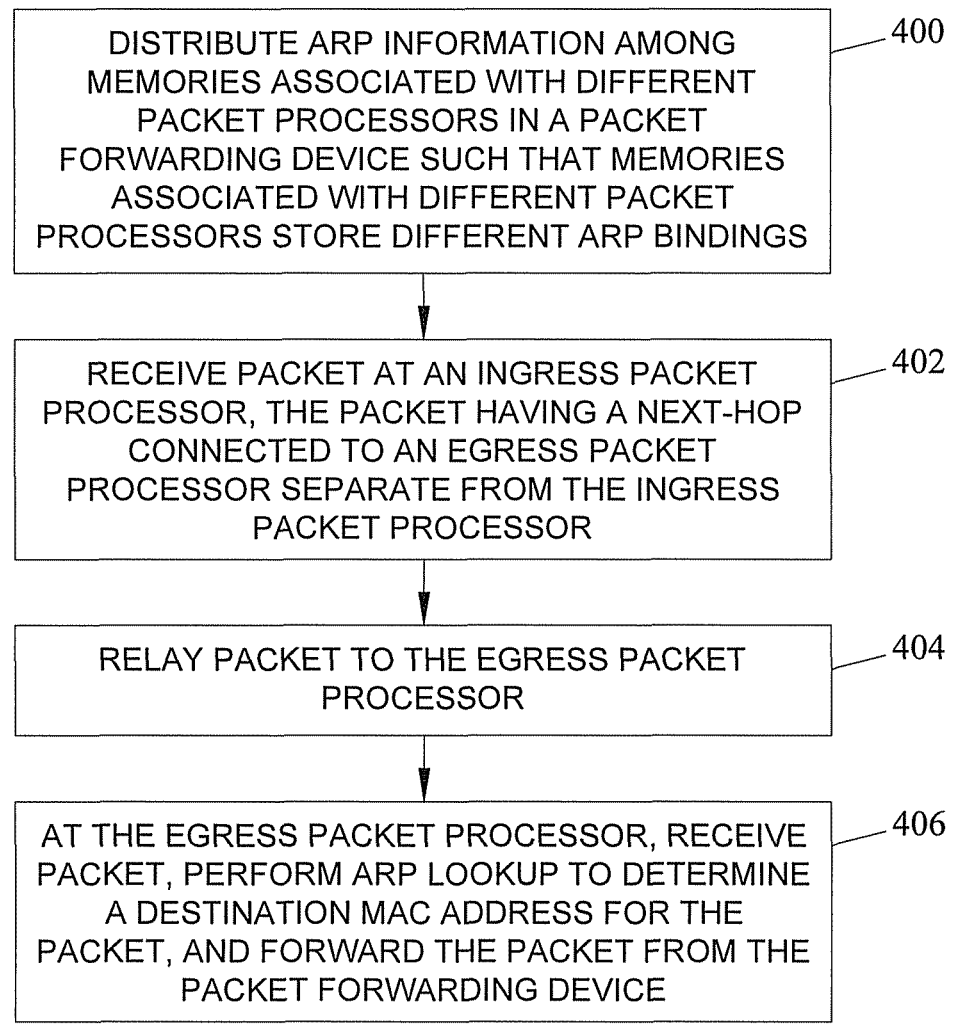
FIG. 4 is a flow chart illustrating an exemplary method for next hop scaling according to an embodiment of the subject matter described herein.

FIG. 4 is a flow chart illustrating an exemplary process for next hop scaling according to an embodiment of the subject matter described herein. Referring to FIG. 4, in step 400, ARP information is distributed among memories associated with different packet processors in a packet forwarding device such that memories associated with different packet processors store different ARP bindings. For example, as illustrated in FIG. 3, the next hop table associated with each packet processor may store full MAC addresses for directly connected hosts and may store relay entries for hosts that are connected to other packet processors.

In step 402, a packet is received at an ingress packet processor. The packet has a next hop connected to an egress packet processor that is separate from the ingress packet processor. For example, referring again to FIG. 3, a packet may be received at slot1:port1, the packet may have an IP address 10.0.1.6, which has a next hop which corresponds to the slot2 packet processor.

Returning to FIG. 4, in step 404, the packet is relayed to the egress packet processor. Continuing with the present example, the packet addressed to 10.0.1.6 that arrives at slot1:port1 will result in a match with the second entry in next hop table 114A and will be forwarded to the slot2 packet processor. The relayed packet will have an unused port number in its fabric header.

Returning to FIG. 4, in step 406, at the egress packet processor, the packet is received, the unused port address in the fabric header triggers an ARP lookup to determine the destination MAC address and the packet is forwarded from the packet forwarding device. Continuing the present example, a packet addressed to 10.0.1.6 will match the third entry in the slot2 layer3 route table and the second entry in next hop table 114B. The MAC address in the packet will be replaced with MAC2, and the VLAN address will be set to VLAN2. The packet will be forwarded from packet forwarding device 100 using slot2:port1.

Thus, using distributed storage of next hop bindings combined with relay entries on egress packet processors and egress next hop lookups, improved ARP scaling is achieved. A packet forwarding device with next hop scaling as described herein can be used to greatly increase the number of physical and/or virtual hosts that can be served by the packet forwarding device. For example, because the storage of next hop bindings is distributed across the packet processors, the number of hosts that can be served is limited by the total memory storage space across all of the packet processors, rather than being limited to the memory storage of a single packet processor. For example, if a given packet forwarding device has four packet processors, the packet forwarding device can accommodate a distributed next hop table with a number of entries that can be stored in the combined storage space of the four packet processors. The total number of next hop entries that can be stored would not be exactly equal to four times that of one of the packet processors, as the relay entries occupy some space on the ingress packet processors. In addition, hosts may not be evenly distributed among the packet processors. The subject matter described herein thus makes the packet forwarding device more scalable, as adding additional packet processors allows more hosts to be served with a decreased likelihood of reaching the maximum number of next hop table entries.

Although in the examples described above, each packet processor has an equal amount of storage space for ARP bindings, the subject matter described herein is not limited to such an embodiment. The methods and systems for ARP scaling described herein also increase the scalability of a packet forwarding device when the packet processors have different amounts of storage space for ARP bindings.

Although the subject matter described above relates to distributed ARP scaling, the subject matter described herein is not limited to ARP scaling and can be applied to any type of next hop scaling without departing from the scope of the subject matter described herein. For example, the subject matter described herein can be used for distributed storage of neighbor discovery bindings (the ARP equivalent for IPv6) without departing from the scope of the subject matter described herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for address next hop scaling, the system comprising:
a packet forwarding device including:
a plurality of packet processors for performing packet forwarding operations;
a memory associated with each packet processor, the memory for storing next hop bindings for the hosts, wherein an ingress packet processor and memory associated with the ingress packet processor are configured to relay to an egress packet processor separate from the ingress packet processor a packet whose next hop is connected to the egress packet processor and wherein the egress packet processor and its memory that receive the relayed packet are configured to perform a next hop lookup to supply a destination MAC address for the packet and forward the packet to the next hop; and
wherein each memory stores a layer 3 host or layer 3 longest prefix match route table that maps IP address information to next hop information and a next hop table that maps the next hop information to layer 2 packet forwarding information.

2. The system of claim 1 wherein the memory associated with each packet processor stores relay entries for next hops connected to the remaining packet processors.

3. The system of claim 2 wherein the memory associated with each packet processor stores a single relay entry for each of the remaining packet processors.

4. The system of claim 2 wherein receipt of a packet that matched a relay entry on an ingress packet processor triggers an egress packet processor to perform an egress next hop lookup.

5. The system of claim 3 wherein the relay entries do not store MAC addresses for hosts connected to the remaining packet processors.

6. The system of claim 1 wherein the memory associated with each packet processor stores MAC addresses only for next hops that are directly connected to each packet processor such that next hop bindings for all of the hosts are distributed among the memories associated with all the packet processors.

7. The system of claim 1 wherein the available memory for the layer 3 host or longest prefix match route table and the next hop table is shared.

8. The system of claim 7 wherein each memory stores a MAC forwarding database that stores MAC and VLAN information for hosts connected to the packet forwarding device.

9. The system of claim 1 wherein the memories associated with the packet processor store next hop bindings for real and virtual hosts.

10. The system of claim 1 wherein the next hop bindings comprise address resolution protocol (ARP) bindings.

11. The system of claim 1 wherein the next hop bindings comprise IPv6 neighbor discovery bindings.

12. A method for next hop scaling, the method comprising:
distributing next hop information among memories associated with different packet processors in a packet forwarding device including a plurality of packet processors such that memories associated with different packet processors store different next hop bindings;
receiving a packet at an ingress packet processor, the packet having a next hop connected to an egress packet processor separate from the ingress packet processor;
relaying the packet to the egress packet processor;
at the egress packet processor, performing a next hop lookup to supply destination MAC information for the packet and forwarding the packet from the packet forwarding device; and
wherein each memory stores a layer 3 host or longest prefix match route table that maps IP address information to next hop information and a next hop table that maps the next hop information to layer 2 packet forwarding information.

13. The method of claim 12 wherein the memory associated with each packet processor stores relay entries for next hops connected to the remaining packet processors.

14. The method of claim 13 wherein the memory associated with each packet processor stores a single relay entry for each of the remaining packet processors.

15. The method of claim 13 wherein receipt of a packet that matched a relay entry on an ingress packet processor triggers an egress packet processor to perform an egress next hop lookup.

16. The method of claim 14 wherein the relay entries do not store MAC addresses for hosts connected to the remaining packet processors.

17. The method of claim 14 wherein the relay entries do not store MAC addresses for hosts connected to the remaining packet processors.

18. The method of claim 12 wherein the memory associated with each packet processor stores MAC addresses only for next hops that are directly connected to each packet processor such that next hop bindings for all of the hosts are distributed among the memories associated with all the packet processors.

19. The method of claim 12 wherein the available memory for the layer 3 host or longest prefix match route table and the next hop table is shared.

20. The method of claim 19 wherein each of the memory stores a MAC forwarding database that stores MAC and VLAN information for hosts connected to the packet forwarding device.

21. The method of claim 12 wherein the next hop bindings comprise address resolution protocol (ARP) bindings.

22. The method of claim 12 wherein the next hop bindings comprise IPv6 neighbor discovery bindings.

23. A non-transitory computer readable medium having stored thereon executable instructions that when executed by the processor of the computer control the computer to perform steps comprising:
distributing next hop information among memories associated with different packet processors in a packet forwarding device including a plurality of packet processors such that memories associated with different packet processors store different next hop bindings;
receiving a packet at an ingress packet processor, the packet having a next hop connected to an egress packet processor separate from the ingress packet processor;
relaying the packet to the egress packet processor;
at the egress packet processor, performing a next hop lookup to supply destination MAC information for the packet and forwarding the packet from the packet forwarding device; and
wherein each memory stores a layer 3 host or layer 3 longest prefix match route table that maps IP address information to next hop information and a next hop table that maps the next hop information to layer 2 packet forwarding information.

* * * * *